United States Patent [19]

Kline

[11] Patent Number: 4,616,605
[45] Date of Patent: Oct. 14, 1986

[54] TWO-CYCLE ENGINE WITH IMPROVED SCAVENGING

[76] Inventor: Herbert E. Kline, P.O. Box 24, Claverack, N.Y. 12513

[21] Appl. No.: 688,070

[22] Filed: Dec. 31, 1984

[51] Int. Cl.[4] .................... F02B 75/02; F02D 39/04
[52] U.S. Cl. ................... 123/65 VD; 123/257; 123/281
[58] Field of Search ............... 123/257, 65 VD, 281

[56] References Cited

U.S. PATENT DOCUMENTS

| | | | |
|---|---|---|---|
| 675,796 | 6/1901 | Schumm | 123/65 VD |
| 820,285 | 5/1906 | Cross | 123/65 VD |
| 1,605,000 | 11/1926 | Schneider | 123/257 |
| 1,613,226 | 1/1927 | Held | 123/257 |
| 1,638,288 | 8/1927 | Burtnett | 123/65 VD |
| 1,758,429 | 5/1930 | Cory | 123/65 VD |
| 2,108,365 | 2/1938 | Buchl | 123/65 VD |
| 2,136,070 | 11/1938 | Bokemuller | 123/65 |
| 2,222,134 | 11/1940 | Augustine | 123/32 |
| 2,313,017 | 3/1943 | Hurum | 123/65 VD |
| 2,587,339 | 2/1952 | Du Rostu | 123/281 |
| 3,880,126 | 4/1975 | Thurston | 123/65 VD |
| 3,976,038 | 8/1976 | Stahl | 123/257 |

FOREIGN PATENT DOCUMENTS

| | | | |
|---|---|---|---|
| 947832 | 11/1949 | France | 123/65 |
| 359545 | 11/1931 | United Kingdom | 123/65 |

*Primary Examiner*—Ronald B. Cox
*Attorney, Agent, or Firm*—Heslin & Rothenberg

[57] ABSTRACT

A two-cycle internal combustion engine having an "open" combustion chamber/poppet valve arrangement that produces improved scavenging. The combustion chamber has a generally oblate configuration and is slanted with respect to the cylinder axis in such a manner that the air flowing therein converges and is directed downward in a collimated column into the cylinder. The placement of overhead cam operated poppet valves in combination with the combustion chamber produces a scavenging method of the reverse return-flow type. A displacer piston having a displacer with a peripheral wall corresponding in configuration to that of the combustion chamber and defining a recess of predetermined volume that forms the floor of the combustion chamber when the piston is located in its upper most position may be advantageously employed. Variable valve timing is achieved by opening and closing the exhaust and inlet valves unsymmetrically in order to improve the scavenging efficiency and asymmetrically to cause an increase in the effective expansion ratio.

17 Claims, 9 Drawing Figures

Fig_1

Fig_2_

VALVE TIMING DIAGRAMS
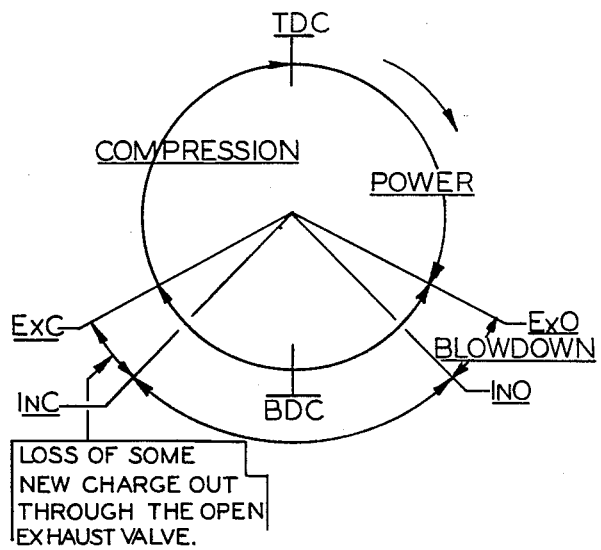
FIG. 5 (A) SYMMETRICAL TIMING
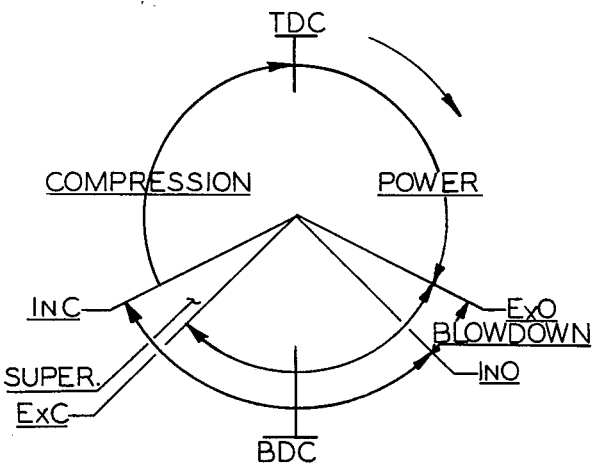
FIG. 5 (B) UNSYMMETRICAL TIMING
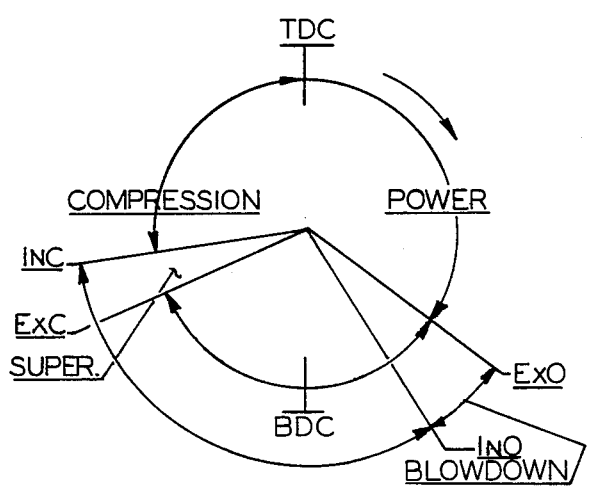
FIG. 5 (C)
ASYMMETRICAL & UNSYMETRICAL
TIMING MORE-COMPLETE-EXPANSION-
CYCLE
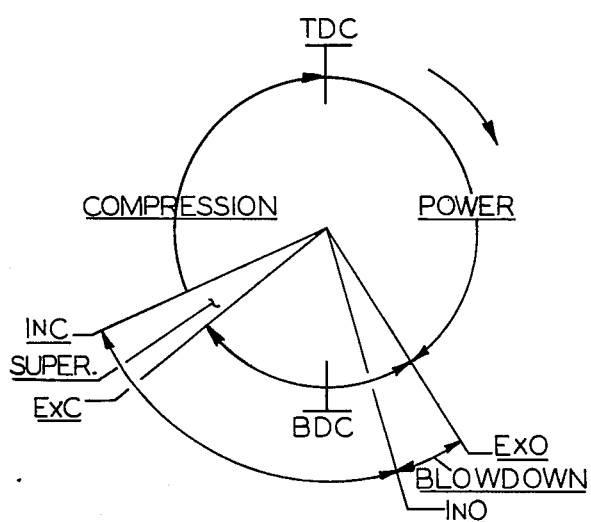
FIG. 5(D)
SAME AS (C) BUT SHOWING
EFFECTIVE VALVE TIMING
LEGEND
ExO — EXHAUST VALVE OPENS
INO — INLET VALVE OPENS
ExC — EXHAUST VALVE CLOSES
BLOWDOWN - BLOWDOWN OF OLD CHARGE
SUPER. — SUPERCHARGE
INC - INLET VALVE CLOSES

TWO-CYCLE ENGINE WITH IMPROVED SCAVENGING

BACKGROUND OF THE INVENTION

This invention relates to internal combustion engines of the two-stroke-cycle spark ignition gasoline and diesel types, more specifically, to combustion chamber and displacer piston constructions designed to improve the scavenging of combustion products and the introduction of fresh charge when overhead cam operated inlet and exhaust valves are used. This invention also relates to a selective valve timing method that further improves the engine's scavenging effectiveness and increases its expansion ratio.

The specific output of a two-stroke-cycle engine is largely determined by its scavenging effectiveness which is defined as the ability to successfully remove burned and residual gases of the preceding cycle from the cylinder and fill the cylinder with fresh charge. The scavenging effectiveness itself varies with the blower or scavenging pump delivery ratio and with the particular airflow pattern through the cylinder and in the present invention also through the combustion chamber.

In an attempt to improve the scavenging effectiveness, several two-cycle diesel engines employing cam operated inlet and exhaust valves have been proposed. Many serious deficiencies and drawbacks, however, are associated with these earlier designs. For example, one particular internal combustion engine, as described in U.S. Pat. No. 2,222,134, employs an inlet valve alongside of the cylinder and a relatively flat, laterally extending combustion chamber in an attempt to provide a more thorough scavenging of combustion products by allegedly directing the incoming air into a single axial flow column which flows into the cylinder, hits the piston, then flows upward until it exits through an exhaust passage. The major difficulty with the configuration of this particular combustion chamber is that a small flow area produces high velocity air that enters the chamber, travels horizontally through the chamber and then makes a 90° turn and flows vertically into the cylinder. Instead of directing a strong, single column, axial flow of air downward into the cylinder, the airflow short-circuits and scatters across the cylinder, reducing the overall effectiveness of the scavenging process. Another major difficulty with the above engine is the narrowness of the opening between the combustion chamber and the cylinder. The diameter of the opening is such that the air velocity would be much too high for modern engines, causing turbulence within the cylinder, channeling, and high pumping losses. Moreover, the narrow opening increases the time required for complete scavenging, thus reducing engine RPM's.

Another attempt to improve the efficiency of a two-cycle diesel engine is depicted in FIG. 6 of U.S. Pat. No. 2,136,070, but this design also fails to direct a single column of air downward into the cylinder or even to specify how scavenging is achieved. This lack of a unidirectional airflow produces poor and limited scavenging and the new charge is likely to short-circuit.

Therefore, it is a major object of this invention to overcome the limitations of the prior art and improve the two-stroke cycle operation by employing overhead valves in combination with an improved combustion chamber in order to provide a flow of scavenging air that is more effective than the prior art. Also, the improved combustion chamber is oriented to provide high turbulence therein during firing in order to promote combustion.

Another object is to provide an improved displacer piston that can cooperate with the combustion chamber to further increase the amount of turbulence created therein as well as to adjust the clearance volume and improve the geometry of the chamber.

Yet another object is to further improve the scavenging efficiency by providing unsymmetrical valve timing for the operation of the inlet and exhaust valves.

A further object is to improve the engine thermodynamic cycle by increasing the expansion ratio and reducing the compression ratio by utilizing asymmetrical valve timing in conjunction with unsymmetrical valve timing. Asymmetrical timing for the purpose of this invention is defined as the skewing of the engine timing about the bottom dead center position of the piston.

A further object is to provide an engine of high specific output that is compact in size and reduced in weight.

A still further object is to provide a two-cycle engine of simpler design requiring fewer cylinders for the same power and uniform torque.

SUMMARY OF THE INVENTION

According to the present invention, the above objects are accomplished through the provision of an especially configured overhead "open" combustion chamber advantageously cooperating with a mating displacer and by operating the overhead inlet and exhaust valves of the engine according to a particular retarded asymmetrical, unsymmetrical timing pattern.

Basically, the new combustion chamber of this invention is an integral component of the cylinder head which overlays the cylinder, is offset with respect to the cylinder axis, and is configured in such a manner as to produce a flow of scavenging air that converges under the inlet valve, sweeps through the combustion chamber, flows axially downward into the cylinder, fills the cylinder from the bottom up and ultimately causes the exhaust products to exit through the overhead exhaust valve(s). The invention makes use of cam operated overhead poppet valves, whereby the inlet valve is seated within the top of the combustion chamber and coaxially aligned therewith. The combustion chamber has an oblate configuration, an opening overlaying the cylinder and sides converging downwardly such that the desired flow of scavenging air enters the cylinder after "blow-down". The exhaust valve(s) and combustion chamber are located in the cylinder head in side-by-side relationship on opposite sides of the cylinder's central axis. In the preferred embodiment, the combustion chamber is slanted and the bottom edge along the side adjacent to the exhaust valves is curved so that the initial direction of the air stream path is directly into the cylinder and along the cylinder wall remote from the vicinity of the exhaust valves. In an alternate embodiment, the combustion chamber is oppositely slanted but the initial direction of the air-stream path is also directed axially into the cylinder and along the adjacent cylinder wall. This is accomplished by increasing the curvature of the inside surface of the combustion chamber adjacent to the exhaust valve(s).

The displacer piston of this invention has a top surface for supporting a displacer that projects into the combustion chamber when the piston nears top dead center. The displacer has an upwardly extending peripheral wall that encloses a centrally located recess. Preferably this recess has a generally hemispherical shape. The external surface of the wall has a configuration that corresponds to and is slightly smaller than the combustion chamber interior wall surface. The internal surface of the displacer recess is configured to define a predetermined volume in order to produce a high degree of turbulence within the combustion chamber when the piston reaches the vicinity of top dead center. As the piston approaches its top dead center position, a strong lateral flow of air called "squish" is created between the top surface of the piston and the underside of the cylinder head. This flow continues into the combustion chamber through a notch or opening in the peripheral wall of the displacer so as to produce a venturi effect in the chamber. Turbulence can thus be adjusted by the shape and size of the notch through which almost all of the "squish" flow must pass. Even without the displacer, considerable turbulence would still be induced in the combustion chamber because of its location and the "squish" effect. Further, when the piston is located at the top dead center position, the displacer forms the floor of the combustion chamber. The volume and the shape of the interior cavity forming the combustion chamber provide for an even distribution of the fuel spray pattern throughout the fresh charge while at the same time a high degree of turbulence is maintained therein.

Also, briefly described, the invention contemplates unsymmetrical valve timing comprising the opening of the exhaust valve(s) and then the inlet valve in a first predetermined time sequence prior to the piston reaching bottom dead center. After the piston reaches bottom dead center and the piston moves upward, the exhaust valves close first, followed by the closing of the inlet valve in a second predetermined time sequence. The valves may be operated by a camshaft which is timed to permit the inlet valve to remain open for a specific duration after the piston has passed bottom dead center in order to prevent loss of fresh charge out through the exhaust and to allow the new charge to be brought up to scavenging blower pressure.

A method of asymmetrical timing is also described, which is accomplished by skewing the engine timing about the bottom dead center position so that most of the scavenging process takes place after bottom dead center which results in increasing the effective expansion ratio. The final result is a more-complete-expansion-cycle and hence greater cyclic efficiency.

To these and other ends, the invention consists of the novel features and combination of parts to be hereafter described and claimed.

BRIEF DESCRIPTION OF THE DRAWINGS

FIGS. 5 and 5a–5d are a diagrammatic showing of the following timing cycles: (a) symmetrical timing of the prior art; (b) unsymmetrical timing of this invention; (c) combined asymmetrical and unsymmetrical timing of this invention; and (d) effective valve timing for (c).

DETAILED DESCRIPTION OF THE DRAWINGS

Figure 1:
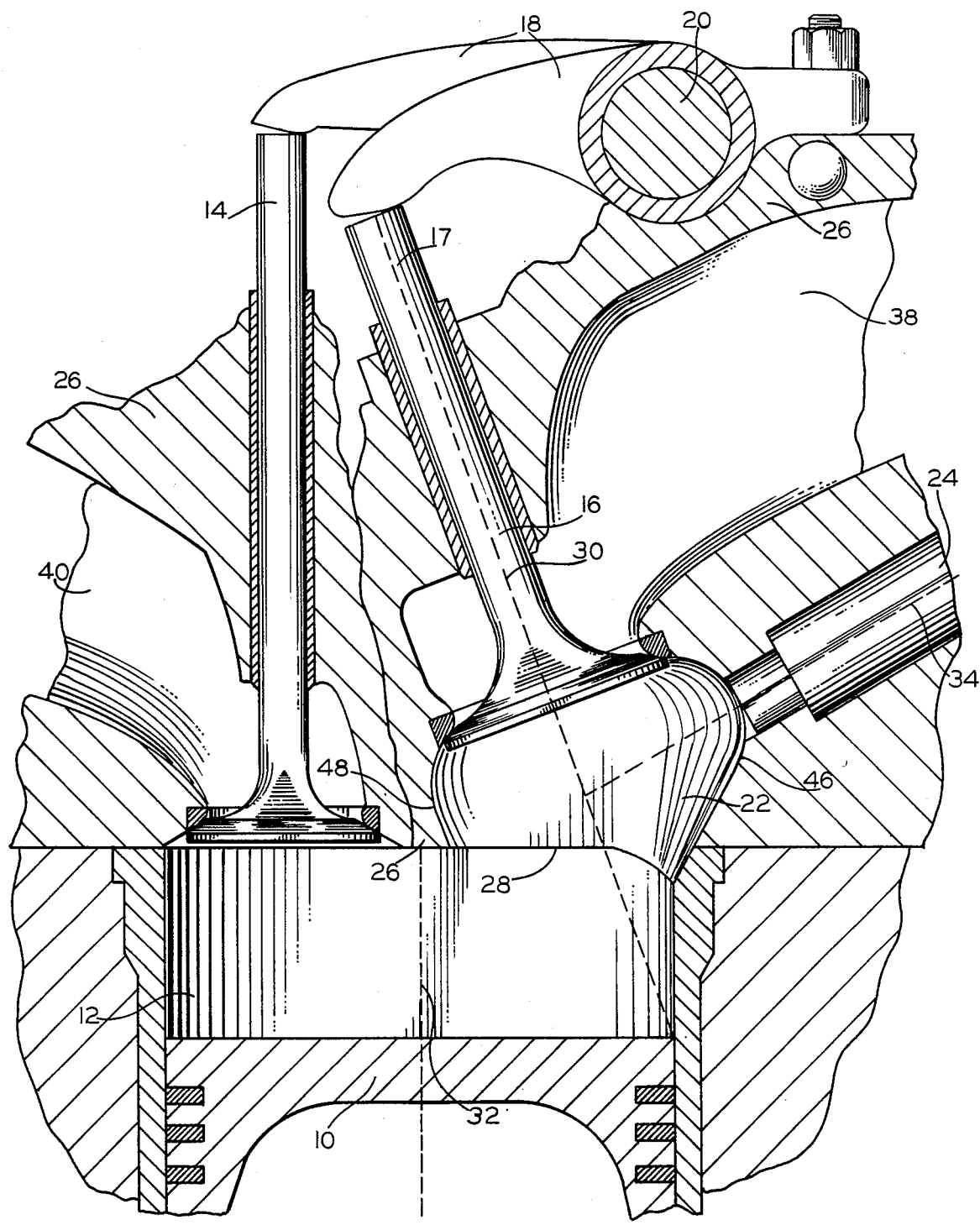
FIG. 1 is a sectional view illustrating the improved engine of this invention and showing the combustion chamber and the inlet valve tilted in a first direction.

Reference is now made to FIG. 1 which illustrates a two-stroke-cycle engine employing the improved combustion chamber/poppet valve arrangement of the present invention. As in conventional internal combustion engines described in the prior art, piston 10 is illustrated as being a flat top piston that is located about mid-way in its power stroke within cylinder 12. It is conceivable, however, that larger inlet valves and flow paths may be used, in which case a displacer piston may be more desirable. This type of piston has a projection located on its top surface that corresponds to the configuration of the combustion chamber in order to reduce the air space or clearance volume when the piston is in the vicinity of top dead center. The displacer piston of this invention will be discussed in more detail below.

Exhaust valve or valves 14 and inlet valve 16 are of the cam operated poppet type located in over-head positions in the cylinder head. The bottom face of exhaust valve 14 is substantially flush with the underside of cylinder head 26, when closed, and is located to one side of cylinder axis 32. Inlet valve 16 seats in the top of combustion chamber 22, with its stem 17 extending along axis 30. Rocker arms 18, associated with these valves, pivot about shaft 20 and are operated from the camshaft by push rods (not shown) or other conventional means. The valves are operated in an out-of-phase relationship in order to achieve asymmetrical unsymmetrical valve timing as more fully described hereinafter.

Still referring to FIG. 1, a key feature of the invention is the design and orientation of combustion chamber 22. Addressing the design feature first, combustion chamber side 46, located adjacent to fuel injector 24, has an angle of curvature that is greater than that of opposing chamber side 48. The airflow dynamics of this type of structure will be discussed in detail below. Combustion chamber 22 is located in cylinder head 26, and superposes cylinder 12 to form an opening 28 in the cylinder head 26 that has a diameter approximately equal to the radius of cylinder 12. Chamber 22 is tilted so that the coincident chamber and inlet valve stem axis 30 is offset from cylinder axis 32 by approximately 20°. Such tilt is important for the effective scavenging of cylinder 12 and for establishing the proper air flow pattern to achieve this end. Fuel injector axis 34 is at a substantially right angle to chamber axis 30 in order to maximize fuel distribution within combustion chamber 22. Fuel injector 24 is of the single orifice nozzle type, the use of which presents an advantage over other two-stroke engines that most often use multi-orifice nozzles which clog easily and are more difficult to manufacture.

Figure 3:
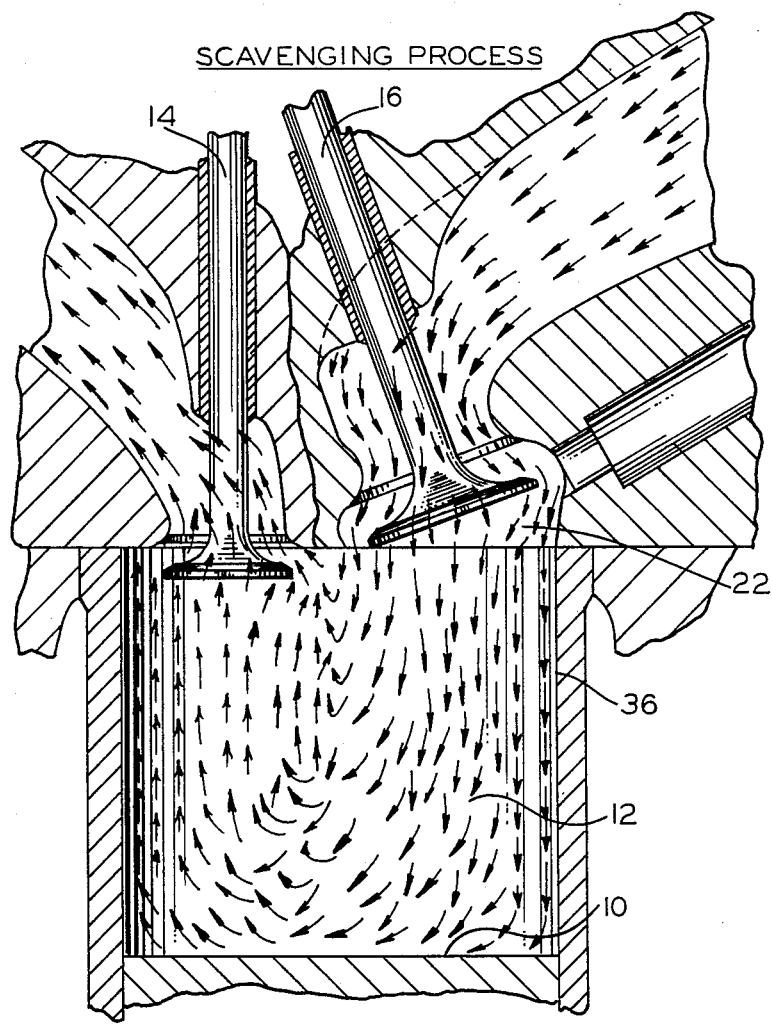
FIG. 3 is a schematic showing the airflow dynamics of the improved scavenging process created by this invention.

Turning now to the airflow dynamics of the scavenging process as illustrated in FIG. 3, the scavenging method of this invention is herein described as the reversed return-flow type. The desired result is obtained by the placement and unique design of combustion chamber 22, in combination with the use of the described overhead valves, proper valve timing, and valve orientation.

Briefly, to summarize the reversed return-flow scavenging process, after the power stroke is completed, the piston is located near bottom dead center, in a position similar to that shown in FIG. 3. The exhaust valve is opened and release and "blow-down" of the cylinder occur. The inlet valve is opened soon thereafter and the influxing air passes through the cylinder, pushing the products of combustion along in front of it, hence the term "scavenging". Finally, both the products of combustion and usually a small protion of the scavenging air, in that order, exit through the exhaust valve.

Now referring to FIG. 3 and the scavenging process of the present invention, piston 10 has almost reached bottom dead center. Exhaust valve 14 is open and release of the cylinder contents is occurring. Inlet valve 16 is also shown in its open position and the scavenging air enters combustion chamber 22 at a high velocity. The orientation of inlet valve 16 to combustion chamber 22 combined with the generally oblate shape and tilt of the chamber produces an airflow pattern that converges at first under inlet valve 24 and forms a collimated flow downward into cylinder 12. The return-flow scavenging scheme of the present invention differs from that generally employed in the prior art in that the scheme is reversed in direction, i.e. it uses both inlet and exhaust poppet valves located in the cylinder head. Generally other return-flow scavenging schemes use piston controlled cylinder wall ports located just above the piston when the piston is located at its bottom dead center position. As illustrated in FIG. 3 as a series of arrows, according to the present invention, the scavenging air enters the cylinder in a converging stream from the combustion chamber located in the cylinder head. In the illustrated embodiments, the scavenging air is directed toward and along cylinder wall 36.

After it reaches cylinder wall 36, the flow is directed downward into the cylinder and attaches itself to the cylinder wall due to the low pressure that exists perpendicular to such a flow. Further, the wall supports the flow and keeps it collimated in a single column and thus prevents it from breaking up or forming wasteful turbulences. The flow on reaching the piston 10 makes a 90 degree turn and flows under the exhaust products forcing the exhaust gases up and out via the overhead exhaust valve(s) 14.

Prior return-flow scavenging schemes generally commence at the piston or outer end of the cylinder, entering the cylinder in an essentially radial direction through the inlet cylinder wall ports while the exhaust gases leave through the cylinder wall exhaust ports. In such scavenging schemes the inflowing air must be able by some means to make a right-angle turn in order to flow up into the cylinder—a difficult problem to face. The elimination of cylinder wall ports offers several additional advantages. The total engine size can be reduced because there is no longer a need to provide air passages surrounding the cylinder itself and therefore the cylinders can be more closely packed. Also the cylinder block is lower because a shorter piston and connecting rod are used. These advantages combine to make a two-cycle engine that is more compact and lighter than those of the prior art.

The unique shape of chamber 22 along with its axial orientation in respect to cylinder 12 is responsible for sweeping the internal solid surfaces with the scavenging air throughout its entire travel. There is little opportunity for the airflow to fragment into wasteful turbulences, to short-circuit out through the exhaust valve or to mix with the burned gases. During the latter part of the scavenging process, the piston moves upward, thereby contributing to the scavenging effectiveness by reducing the cylinder volume and consequently assisting in moving the combustion products up and out through exhaust valve 14; subsequently, the exhaust valve is closed while the inlet valve remains open and the scavenging air continues to flow into the cylinder, bringing its contents up to blower pressure (i.e. supercharging) at which point the inlet valve is closed. Thus the reversed return-flow scavenging process takes place in an orderly and sequential manner.

Combustion chamber 22 is also specifically designed for establishing the critical ranges of flow areas and flow velocities that are crucial to maintaining maximum engine efficiency. An "open"-chamber system is generally preferred because it has the highest fuel economy and is the easiest to start. As illustrated in FIG. 1, chamber opening 28 communicates directly with cylinder 12; the area of opening 28 being approximately one third the cross-sectional area of cylinder 12. In the preferred embodiment, the radial diameter of chamber 22 ranges from 45 percent to 55 percent of the radial diameter of cylinder 12. Also, the volume of combustion chamber 22 preferably ranges approximately between 5 percent to 6 percent of the cylinder displacement volume for diesel engines and, if adapted for use in spark ignition engines, between 12 percent to 16 percent. Furthermore, it is desirable, especially for diesel engines, for the height of chamber 22 to be approximately 25 percent to 35 percent of the chamber diameter. The above dimensions are not intended to be limiting, but are recited only to illustrate the preferred embodiment of this invention. It will be understood that variations in the above dimension ratios may be utilized in order to produce the desired results.

Figure 2:
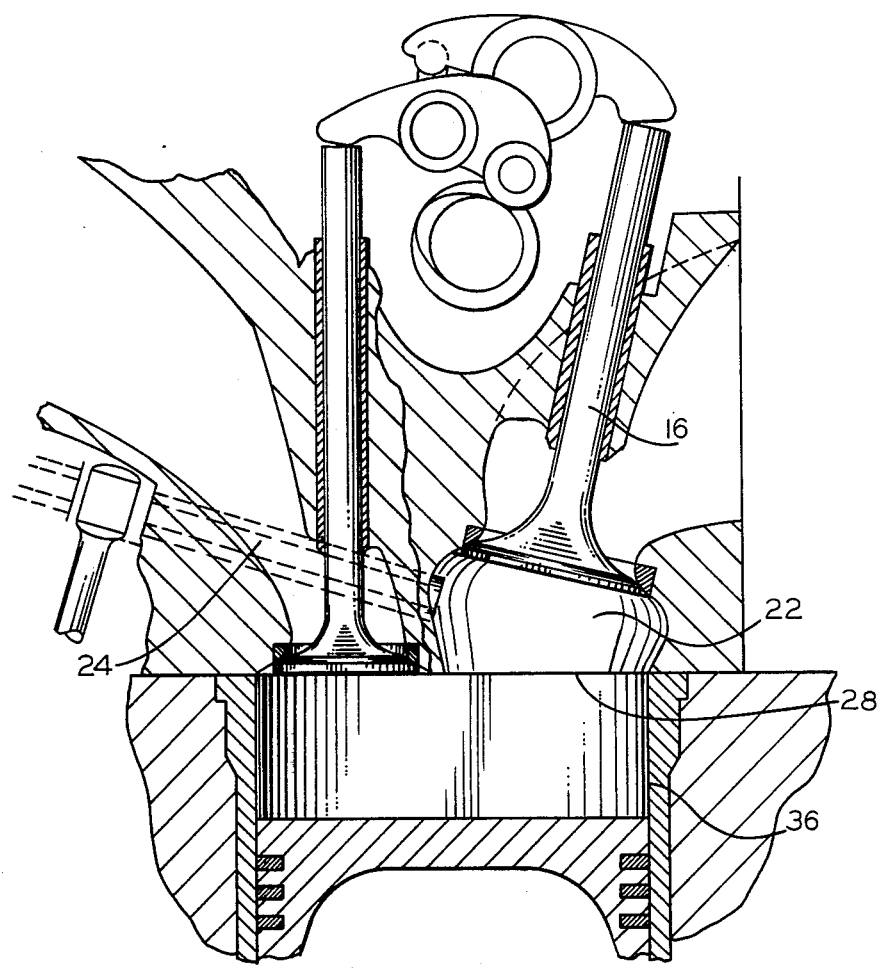
FIG. 2 is a sectional view showing an alternate embodiment of the invention where the combustion chamber and inlet valve are tilted in a second direction.

FIG. 2 illustrates an alternate embodiment of the present invention wherein the flow of scavenging air is also directed away from the axial center of the cylinder towards the cylinder wall 36 by the shape and curvature of the combustion chamber wall adjacent to the cylinder center and exhaust valves. In certain engine designs it is desirable to locate the fuel injector 24 on the opposite side of the cylinder. In this arrangement with the repositioning of the fuel injector, the combustion chamber 22 and inlet valve 16 are tilted in an opposite direction from FIG. 1, as shown in FIG. 2. The flow of scavenging air converges under the inlet valve as it enters the cylinder, forming a single collimated column that eventually fans out as it flows downward. The scavenging efficiency is compromised somewhat in this particular arrangement because a small volume space of relatively low turbulence is formed along side the cylinder wall directly below combustion chamber opening 28. This particular embodiment, however, demonstrates the versatility inherent in the new combustion chamber design described above.

Figure 4:
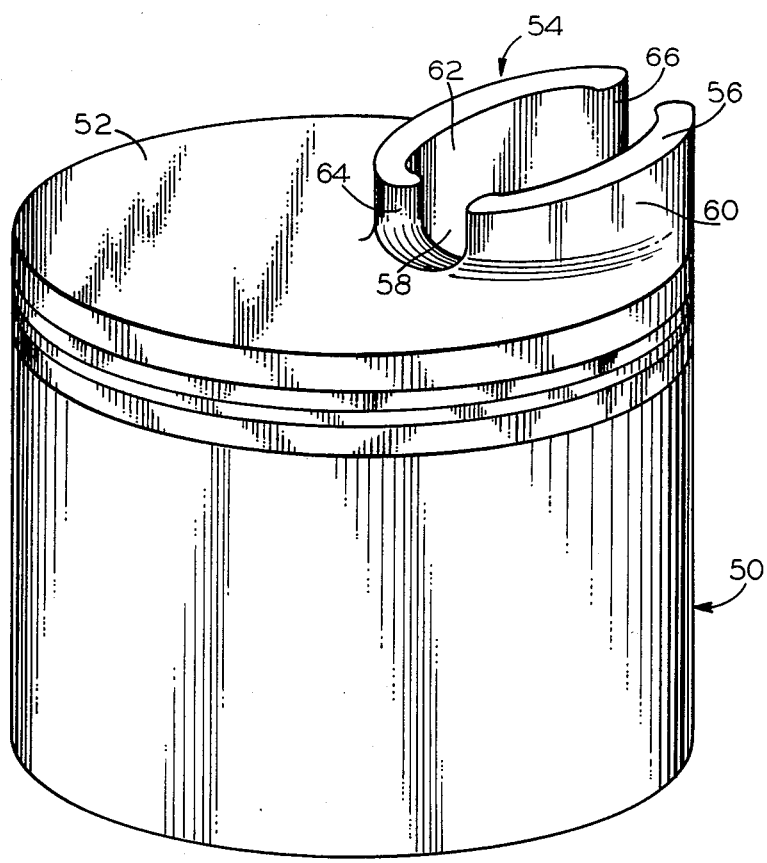
FIG. 4 is a front perspective view of the displacer piston of this invention.

The displacer piston 50 of this invention is illustrated in FIG. 4. As mentioned previously, the displacer piston is used to produce turbulence in the combustion chamber. In this invention the displacer piston has two important additional functions; one, to adjust the compression ratio and two, it forms part of the combustion chamber. In the first instance the advantage lies in the ability of the displacer type piston to reduce the clearance volume within the combustion chamber so that a larger inlet valve and larger flow passages can be utilized. A larger inlet valve requires that a larger clearance volume be provided beneath the inlet valve, but this arrangement normally does not allow a high enough compression ratio for the engine. Hence a displacer piston is provided to reduce the clearance volume and thus increase the compression ratio accordingly. In the second instance, recess 58 of displacer 54 forms the bottom half of the combustion chamber which when viewed in combination with the top half of the combustion chamber, located beneath the inlet valve, forms a compact almost spherical chamber that conforms to the shape of the fuel spray pattern.

As mentioned, an important use of the displacer is to increase turbulence. It is now recognized that a high degree of turbulence is essential, particularly in the open or direct injection type combustion chamber, in order to improve combustion, increase power and reduce fuel consumption. Additionally, high turbulence produces smoother combustion ultimately resulting in a quieter engine.

Still referring to FIG. 4, displacer piston 50 of the present invention has a top surface 52 for supporting displacer 54. The displacer can be made as part of the piston or it can be made separately and secured to top surface 52 by bolts or other securing means. Peripheral wall 56 of displacer 54 extends upwardly defining recess 58. The floor of the recess can be either top surface 52 or additional depth may be provided by forming a cavity in top surface 52. The overall configuration of the displacer, in its preferred embodiment, corresponds to that of the combustion chamber of the present invention. It will be understood, however, that the configuration could be adapted to fit within almost any open direct injection type combustion chamber.

Displacer 54, in the preferred embodiment, has an external surface 60 with a diameter that is slightly smaller than the interior diameter of combustion chamber 22. As the piston moves upward and approaches its top dead center position, displacer 54 is aligned with combustion chamber 22 in such a manner that displacer 54 enters into the chamber. Recess 58 then forms the "floor" of chamber 22 just prior to the firing of the engine by the fuel injector. The volume of recess 58 as defined by internal surface 62, is determined by the degree of clearance volume reduction desired for any one particular compression ratio. Peripheral wall 56 is provided with an air notch 64 which permits the air that is squeezed between the piston and the cylinder head, otherwise known as "squish" air, to enter combustion chamber 22 at a high velocity and with increased turbulence. The degree of turbulence can be adjusted by altering both the size and shape of air notch 64. It has been determined that a modified venturi-shaped notch is preferred or rather a notch that is shaped so as to produce a venturi effect when the displacer is combined with the combustion chamber of the present invention. Fuel injector notch 66 is also formed in peripheral wall 56 to enable displacer 54 to fit around the spray of the fuel injector when the piston is located near top dead center in its firing position.

The scavenging method of this invention, described previously (see FIG. 3), can be effectively coordinated with unsymmetrical timing, whereby an out-of-phase relationship between the operation of inlet valve 16 and exhaust valve 14 is accomplished by the following sequence of steps:

(1) the opening of the exhaust valve precedes that of the inlet valve by a predetermined number of crankshaft degrees of rotation in order to allow the release of the cylinder contents ("blow-down") prior to the opening of the inlet valve and the start of the scavenging process, the optimum time to open the exhaust valve depends on desired engine characteristics and the time allowed for scavenging; however, 45 to 60 degrees before the piston reaches bottom dead center is suitable for the present invention.

(2) a predetermined interval later but still before the piston reaches bottom dead center, the intake valve is opened and the scavenging process begins as the new charge is introduced into the engine through the combustion chamber; both inlet and exhaust valves remain open for a predetermined length of time until the burned gases have been forced out through the exhaust valves;

(3) the exhaust valve is closed somewhat after the piston has passed the bottom dead center position and has commenced its upward stroke; and (4) the inlet valve remains open for a brief period of time allowing the blower pressure to increase the new charge; then at a predetermined time, the inlet valve is closed, the piston continues its upward stroke at which point compression begins again and the cycle is repeated.

The unsymmetrical timing, characterized above is made possible by the use of poppet valves for scavenging. It provides a wide range of possible valve timings that is not essentially dictated by the position of the pistons or the related position of the crankshaft. This feature lends a flexibility to this invention that is not available in other two-stroke cycle engines of the prior art which employed cylinder ports or even in four-stroke cycle engines. Furthermore, an even wider range of valve timings may be selected by rotating the camshaft angularly to a more retarded position relative to the crankshaft, producing what is referred to as asymmetric timing.

The improved scavenging efficiency and the unsymmetrical timing of the present invention when combined with a means for providing asymmetrical timing increases the engine's effective expansion ratio. It is most often assumed that the expansion and compression ratios are equal, however, this is generally not true. Usually the effective expansion ratio is reduced by two ratios or more in regular compression ignition engines, while in engines having a high compression ratio, the expansion ratio is generally reduced by a factor of 4 or more. It is known that a much greater effective expansion ratio would improve engine efficiency. Many attempts have been made to recover at least some of this exhaust energy but none have been completely successful. In the present invention, a simple and practical means to improve the effective expansion ratio has been devised without introducing complex modifications of the engine design and without reduction in potential engine power. In any case the object of carrying out a more-complete-expansion is to improve upon the cycle by extracting more work from the hot gases, thus improving the efficiency.

Basically, the asymmetrical timing of this invention is a combined mechanical and thermodynamic process whereby a more-complete-expansion-cycle is achieved in a two-stroke-cycle engine. This is accomplished by locating the inlet and exhaust valves in the cylinder head and rotating the camshaft in relation to the crankshaft so that the valve timing is skewed about the bottom dead center of the piston (see FIG. 5). The exhaust valve is opened as close as practicable to bottom dead center while the inlet.valve is closed considerably after bottom dead center. The late closing of the inlet valve shifts the scavenging process so that the major portion of it takes place after the piston reaches bottom dead center. This represents a major difference from the present state-of-the-art in two-cycle engine development. This results in a greater expansion ratio relative to the compression ratio because the effective expansion stroke is somewhat increased while the compression stroke is decreased. It is understood that this arrangement reduces the potential cylinder charge that would appear to reduce the power produced. However, compensation for this is effected through improved thermodynamic efficiency, the supercharge effect achieved, and of course, operation on the two-stroke principle.

Any of the known approaches for selectively operating overhead valves may be employed to implement the asymmetrical, unsymmetrical timing sequence of the present invention.

The differences between the valve timing of the present invention and that of the prior art are illustrated more clearly in FIG. 5. FIG. 5(a) represents the timing of a typical port scavenging two-cycle engine of the prior art resulting from piston controlled inlet and exhaust ports where the exhaust ports open first and close last, each opening and closing occurring the same number of degrees from bottom dead center, hence the term symmetrical timing. In port scavenging, the piston acts as a slide valve whereby its motion opens and closes the ports. The weakness of this design is the loss of cylinder charge out through the open exhaust port after the inlet port is closed; further, the timing of this type of engine is severely limited and the design is now nearly obsolete.

FIG. 5(b) shows an unsymmetrical timing diagram in which the exhaust valve both opens and closes before the inlet valve. It is different from other unsymmetrical timed engines in that there are no piston controlled ports in this invention, therefore the opening and closing sequences are selectively and completely independent of one another.

A major advantage in the unsymmetrical valve timing of the present invention is that the most optimum arrangement can be selected without being completely dictated by the movement of the piston. Also, the present invention offers a greater latitude with respect to possible valve-timing combinations. The use of valves instead of cylinder wall ports offers the additional advantage of being able to eliminate the need for symmetrically timing the inlet and exhaust phases of the combusion cycle. Further, and most importantly, unsymmetrical timing allows charge restoration to the cylinder or supercharging as desired by bringing the new charge up to blower pressure. This represents at least a 50% charge increase over that of the symmetrically timed engine.

By way of explanation, there are many heavy duty return-flow, port scavenging symmetrically timed engines that achieve, in effect, unsymmetrical timing. In most cases this is done by blocking off one or more sets of ports in such sequences as to produce this effect. This approach, however, is far too expensive and complicated for the small engine manufacturer. Moreover, this type of engine is larger and heavier than that of the present invention and not as efficient.

FIG. 5(c) is a diagram showing unsymmetrical timing which has been skewed about bottom dead center in a more retarded fashion, producing what in this description is referred to as asymmetrical valve timing. This arrangement makes possible the more-complete-expansion cycle where the expansion stroke is increased and the compression stroke is reduced relative to each other. Thus more work is extracted from the cycle in respect to the amount of fuel consumed.

FIG. 5(d) is the same as FIG. 5(c) but illustrates the effective timing as related to piston motion rather than in (c) where the shown timing is related to crankshaft degrees. This demonstrates how little of the piston stroke is actually taken up by the scavenging process.

By these means, the two-cycle engine of the present invention has a high specific output and when compared to normally aspirated four-cycle engines will produce 1.5 to 1.75 times more power for the same RPM and engine displacement. Furthermore, utilizing the asymmetrical timing of the present invention produces 1.2 to 1.3 times more power than that produced by supercharged four-cycle engines.

From the foregoing, many of the advantages of this subject invention are now clear. Perhaps the most important advantage to the above invention is the increased efficiency of the entire scavenging process as accomplished by the configuration and orientation of the combustion chamber along with the new displacer piston design and associated range of valve timings.

It will be appreciated by those familiar with the art that the above described invention has been described in terms of the preferred embodiments and that various changes can be made without departing from the intent of this invention which is intended only to be limited by the appended claims.

What I claim is:

1. An improved two-cycle internal combustion engine comprising:
    a cylinder;
    a cylinder head having an exhaust valve and an open type combustion chamber located therein, said chamber and exhaust valve being located in side-by-side relationship on opposite sides of a central axis of the cylinder;
    an air inlet valve located within and in the top of the combustion chamber, said inlet valve having a valve stem located overhead said cylinder;
    a piston reciprocally disposed with the cylinder;
    means for converging a flow of scavengering air beneath the inlet valve into a colimated column as it enters the cylinder, said converging means comprising the combustion chamber having a generally oblate configuration with sides converging downwardly to form an opening which overlies the opposed sides with predetermined different angles of curvature; and
    wherein the inlet valve and the combustion chamber are coaxially aligned and oriented to the central axis of the cylinder at a predetermined angle and wherein the flow of scavenging air is directed toward and along an inside wall of the cylinder, said inside wall being on the same side of the cylinder axis as the combustion chamber.

2. The engine of claim 1 further comprising a fuel injector located adjacent to the combustion chamber and oriented with respect to the cylinder axis at an angle equal approximately to said predetermined angle plus 90°.

3. The engine of claim 2 wherein the opening of the combustion chamber has an area equal approximately to one-third of the cross-sectional area of the cylinder.

4. The engine of claim 3 wherein said injector comprises a single orifice nozzle type fuel injector, said inlet and exhaust valves comprise poppet valves, and wherein said exhaust valve has a lower face which is substantially flush with the underside of the cylinder head when the exhaust valve is closed.

5. The engine of claim 4 wherein the inlet and exhaust valves are operated in accordance with an asymmetric, unsymmetric timing sequence such that the major portion of scavenging occurs after the piston reaches a bottom dead center position.

6. The engine of claim 5 wherein said piston comprises a displacer piston.

7. The engine of claim 6 wherein said displacer piston comprises:
   a piston having a top surface; and
   a displacer supported on said top surface for projecting into the combustion chamber when the piston nears a top dead center position.

8. The engine of claim 7 wherein said displacer comprises an upwardly extending peripheral wall surrounding a recess, the recess being of a generally hemispherical configuration and forming the floor of the combustion chamber when the piston is in its firing position.

9. the engine of claim 8 wherein the wall of the displacer includes a first notch therethrough configured to induce a high degree of turbulenece in the combustion chamber.

10. The engine of claim 9 wherein said first notch is configured to produce a venturi effect in the combustion chamber.

11. The engine of claim 10 wherein the wall of the displacer is provided with a second notch facilitating entry of spray from the fuel injector into the combustion chamber when the piston is located in the vicinity of said top dead center position.

12. The engine of claim 1 wherein said piston comprises a displacer piston.

13. The engine of claim 12 wherein said displacer piston comprises:
   a piston having a top surface; and
   a displacer supported on said top surface for projecting into the combustion chamber when the piston nears a top dead center position.

14. The engine of claim 13 wherein said displacer comprises an upwardly extending peripheral wall surrounding a recess, the recess being of a generally hemispherical configuration and forming the floor of the combustion chamber when the piston is in its firing position.

15. The engine of claim 14 wherein the wall of the displacer includes a first notch therethrough configured to induce a high degree of turbulenece in the combustion chamber.

16. The engine of claim 15 wherein said first notch is configured to produce a venturi effect in the combustion chamber.

17. The engine of claim 16 wherein the wall of the displacer is provided with a second notch facilitating entry of spray from the fuel injector into the combustion chamber when the piston is located in the vicinity of said top dead center position.

* * * * *

UNITED STATES PATENT AND TRADEMARK OFFICE
CERTIFICATE OF CORRECTION

PATENT NO. : 4,616,605
DATED : October 14, 1986
INVENTOR(S) : Kline, Herbert E.

It is certified that error appears in the above-identified patent and that said Letters Patent is hereby corrected as shown below:

In claim 1, column 10, line 41, "with" should read "within"; column 10, line 42, "scavengering" should read "scavenging"; column 10, lines 47-48 between "the" and "opposed" --cylinder, the combustion chamber having diametrically-- should be inserted.

Signed and Sealed this

Third Day of March, 1987

Attest:

DONALD J. QUIGG

Attesting Officer

Commissioner of Patents and Trademarks